United States Patent

Staar

[15] 3,693,908

[45] Sept. 26, 1972

[54] ANTI-VIBRATION DEVICE FOR TAPE TRANSPORTS

[72] Inventor: Theophiel Clement Jozef Lodewijk Staar, Kraainem, Belgium

[73] Assignee: Starr, S. A., Brussels, Belgium

[22] Filed: March 10, 1971

[21] Appl. No.: 122,694

[30] Foreign Application Priority Data

March 13, 1970 Belgium........................86,368

[52] U.S. Cl................................242/198, 248/358 R

[51] Int. Cl.......G03b 1/04, G11b 15/32, G11b 23/04

[58] Field of Search.......242/55.19 A, 194, 197–200; 248/358 R

[56] References Cited

UNITED STATES PATENTS

| | | | |
|---|---|---|---|
| 3,043,531 | 7/1962 | Sinkewitsch | 242/198 X |
| 3,400,936 | 9/1968 | Staar | 274/11 C |
| 3,561,767 | 2/1971 | Negishi | 274/4 C |
| 3,395,871 | 8/1968 | Ackermann et al. | 242/198 |

*Primary Examiner*—Leonard D. Christian
*Attorney*—Wolfe, Hubbard, Leydig, Voit & Osann

[57] ABSTRACT

An anti-vibration device for a tape deck of the type having a main frame and a movable plate carrying the tape transport elements. The movable plate is restrained from vibrating against the supporting main frame by a wedge held resiliently between the plate and frame and engageable with the plate through a pivotably supported bearing member having a wedge retaining groove therein.

6 Claims, 2 Drawing Figures

PATENTED SEP 26 1972 3,693,908

INVENTOR
THEOPHIEL CLEMENT JOZEF LODEWIJK STARR by: Wolfe, Hubbard, Leydig, Voit & Osann
ATTYS.

ANTI-VIBRATION DEVICE FOR TAPE TRANSPORTS

This invention relates generally to tape recording and reproducing apparatus, and more particularly to apparatus for eliminating the vibration or undesirable movement between parts of such apparatus.

The use of tape recording and playback apparatus utilizing tape transports or tape decks in automobiles and other vehicles has become increasingly common. Such vehicle installations, however, subject the tape transport to prolonged periods of vibration and mechanical shock not found in many other tape deck installations. It has been found that such externally caused vibration is detrimental to the operation of the tape transport and to the quality of the music or other sound it reproduces.

One modern form of tape transport comprises two general assemblies. One assembly includes a stationary frame, which carries a tape playback head and rubber roller adapted to pinch the tape against the tape drive capstan. Movably mounted upon the frame is a second assembly including a plate which carries tape driving capstans and tape reel spindles. With this form of tape transport, investigation has shown that vibration of the movable plate assembly against the walls of the stationary frame can produce audible and irritating musical distortion during playback operation.

It is accordingly the general object of this invention to provide a tape recording and playback apparatus, or tape transport which, when installed in a vehicle or like location, is relatively unaffected by externally caused vibrations in its recording and playback functions.

It is a further object to restrain the movable plate of such apparatus from lateral vibration against its main frame when installed in a vehicle or other locations where the apparatus is subjected to vibration-producing motion.

It is an associated object of the invention to provide a tape recording and playback device wherein recording distortion caused by external vibrations are minimized.

It is another object of this invention to employ repeating vibratory forces which act upon a tape transport to decrease the relative motion between the main frame and the movable plate, rather than allowing such forces to increase such relative motion.

Another object is to provide an anti-vibration device for tape transports which is self-adjusting, thus eliminating the need for frequent re-adjustment when wear of its component parts has occurred.

Figure 2:
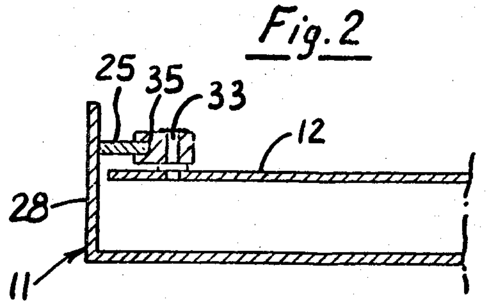
Figure 1:
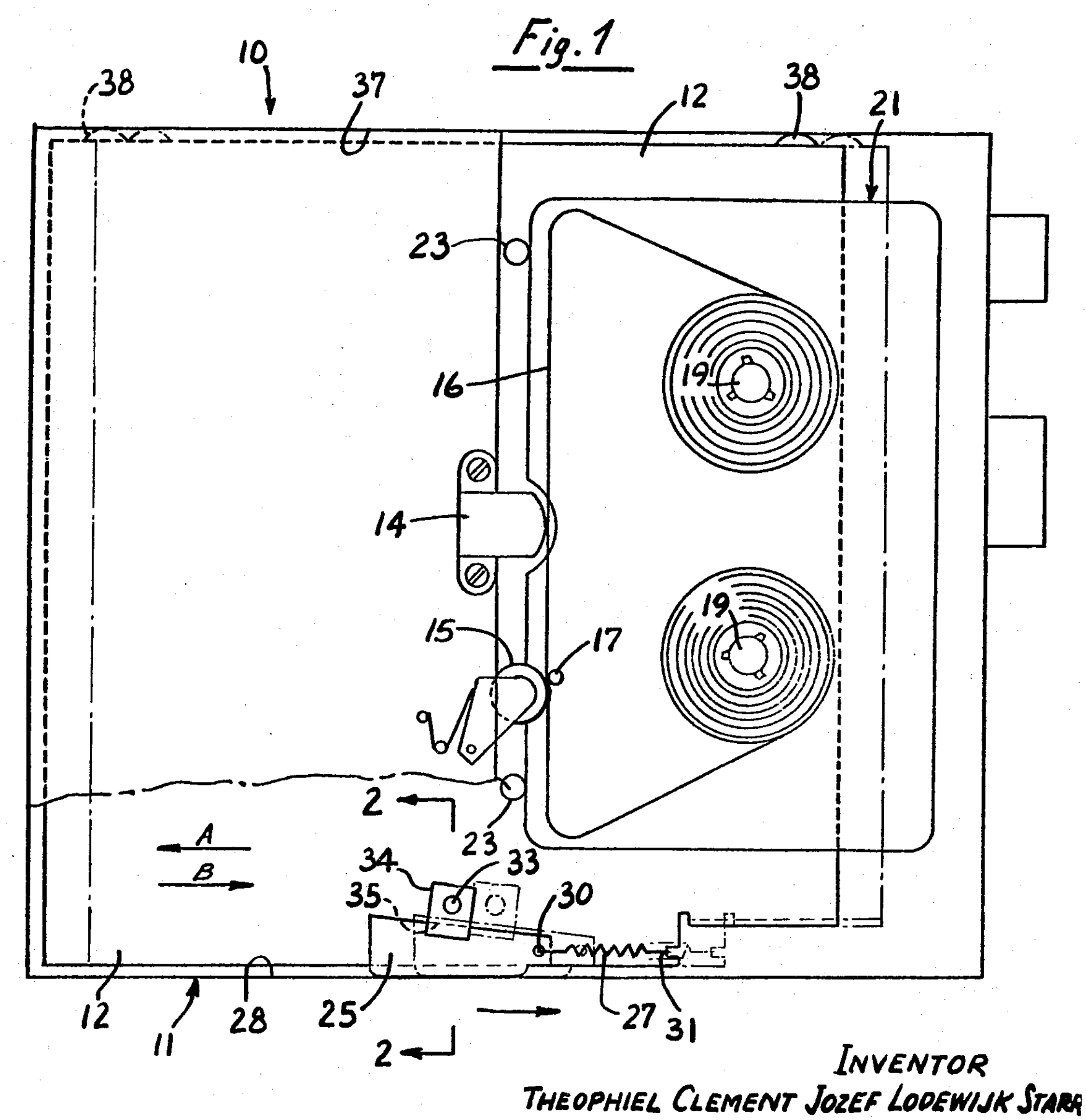

Other objects and advantages of the invention will become apparent upon reading the following detailed description and upon reference to the drawings, in which:

FIG. 1 is a plan view, somewhat diagrammatic in nature, of a tape transport including an embodiment of the invention, the components of the transport being located in a playing or operative position, and FIG. 2 is a partial sectional view, taken along line 2—2 of FIG. 1, showing in further detail an embodiment of the invention.

While the invention will be described in connection with a preferred embodiment, it will be understood that I do not intend to limit the invention to that embodiment. On the contrary, I intend to cover all alternatives, modifications and equivalents as may be included within the spirit and scope of the invention.

Turning to the figures, there is shown a tape transport 10 for recording and playing back recorded sound tapes. The transport illustrated here is of the type shown in my U.S. Pat. No. 3,385,534 suited especially to accept and use tape cassettes, although it is contemplated that such transport may be adapted to use other arrangements of tape presentation and storage. The transport 10 has a stationary frame 11, and a plate 12 movable with respect to the frame 11 along a path in the directions indicated by arrows A and B into a playing position and a non-operating position. When moved in the direction indicated by the arrow A, the plate is moved into a playing position; when moved in the direction B, the plate is moved into a non-operating position, as indicated by the phantom lines in FIG. 1.

Mounted directly upon the frame 11 are a tape recording and playback head 14, at least one tape or pinch roller 15 for pressing a sound tape 16 against a driving capstan 17, and other apparatus. Mounted upon the movable plate 12 is the driving capstan 17 and reel spindles 19, together with suitable driving mechanism (not shown) for rotating the capstan 17 and spindles 19. As illustrated here, when the movable plate 12 is located in its non-operating position, a cassette 21 may be placed upon the transport and urged in the direction A. Such action engages the cassette 21 with abutments 23 mounted upon the movable plate 12, and forces the plate 12 and cassette 21 together into the operating position.

One of the problems found with this tape transport unit when mounted and operated in an environment such as a vehicle, where the unit is subject to external vibration, is that the slightest relative motion, caused by such vibration, between the tape heads and the tape drive causes audible musical distortion during playback operation. Any relative motion occuring in a direction parallel to the tape will interfere with the precise relative speed and tape positioning on the playback head required for good fidelity of reproduction, resulting in particularly noticeable distortion. The apparatus shown in my patent includes locating pins (FIGS. 18, 19) to overcome this problem and hold the movable tape transport plate against such relative movement. However, this arrangement is subject to wear and requires adjustment. In keeping with this invention, accordingly, an anti-vibration device is installed upon the transport to hold the plate 12 against movement relative to the frame 11, and particularly lateral relative movement parallel to the tape. To this end, the anti-vibration device includes a wedge member 25 interposed between the plate 12 and frame 11, and urged into a wedging, vibration-eliminating position by a resilient biasing member 27 disposed generally parallel to the adjacent frame wall 28. For urging the wedge 25 between the adjacent frame portion 28 and the movable plate 12, the biasing member 27 is connected at one end 30 to the wedge 25 and at the other end 31 to the movable plate 12.

The movable plate 12 is engaged by the wedge 25 through a support member 33 secured to the plate 12 and a pivotable bearing member 34. In the illustrated device, the bearing member 34 is provided with a wedge-retaining groove 35 (FIG. 2).

For engaging the frame 11 along the side 37 opposite that upon which the wedge 25 and wedge support 33 are located, the movable plate 12 is provided with projections 38, which are urged into contact with the adjacent stationary frame portion 37 by the action of the wedge 25 upon the plate 12.

When the plate is moved longitudinally with respect to the frame in the directions A or B, the wedge 25 is slidably drawn upon the adjacent frame portion 28. As the plate 12 is moved in the direction A into the playing position, the wedge 25 and resilient spring member 27 are drawn in the same direction by the action of the support 33 and bearing member 34 upon the wedge 25. As the plate 12 is moved in the direction B into the non-operating position, the wedge 25 is drawn in the same direction by the resilient spring member 27 which is attached at its end 31 to the plate.

When, however, the plate 12 moves latitudinally in a direction perpendicular to those described above, as may occur when the transport is subjected to vibration, the wedge 25 is caused to slide its increasing width further and further between the adjacent frame 28 and the plate 12 by the pulling action of the resilient spring 27. The movable plate 12 is thus forced by the wedge 25 with increasing firmness between the two opposed portions 28 and 37 of the stationary frame 11 when the tape transport is subjected to vibration, thereby eliminating the latitudinal motion of the plate 12 with respect to the frame 11. It will thus be seen that the anti-vibration mechanism needs no adjustment of its parts, as initially manufactured or thereafter, since it is self-adjusting, even as to any wear of the parts over the lift of the mechanism.

I claim as my invention:

1. An anti-vibration device for a tape transport of the type having a stationary frame, and a plate movable with respect to the frame to a playing position and carrying tape moving apparatus thereon operable in said playing position, comprising the combination of a wedge adapted to be interposed between the frame and plate, and a resilient biasing member for urging the wedge between the frame and the plate during the course of plate movement to playing position so as to restrain the plate against movement when in said playing position.

2. An anti-vibration device for a tape transport of the type having a stationary frame, and a plate movable with respect to the frame along a path to a playing position and carrying tape-moving apparatus thereon operable in said playing position, comprising the combination of a wedge disposed adjacent said plate, and projections fixed upon said plate and disposed along an opposite side of said plate, the projections being urged into engagement with the adjacent stationary frame by the action of the wedge upon the plate.

3. An anti-vibration device according to claim 1, wherein said resilient biasing member urges said wedge between said movable plate and said stationary frame during any motion of the movable plate in a direction away from said frame wall, so as to force the movable plate with increasing firmness between two opposed walls of the stationary frame when the tape recording and playback apparatus is subjected to vibration.

4. An anti-vibration device according to claim 1, including a wedge support member mounted upon said plate, the support member being provided with a wedge retaining groove.

5. An anti-vibration device according to claim 4, wherein said wedge is slidable upon said frame together with said plate when the plate is moved longitudinally with respect to the frame, and wherein said wedge is slidable with respect to both the frame and the plate when the plate moves latitudinally with respect to the frame.

6. An anti-vibration device according to claim 4, wherein said biasing member is a spring extending substantially parallel to the adjacent frame wall, the spring being secured to the wedge and to the movable plate, the wedge being urged between the stationary frame and the support member by the action of the spring.

* * * * *

PO-1050
(5/69)

UNITED STATES PATENT OFFICE
CERTIFICATE OF CORRECTION

Patent No. 3,693,908 Dated September 26, 1972

Inventor(s) Theophiel Clement Jozef Lodewijk Staar

It is certified that error appears in the above-identified patent and that said Letters Patent are hereby corrected as shown below:

In the Patent:

Col. 1, after "Filed May 25, 1972, Ser. No. 122,694" insert -- Claims priority, application Belgium, March 13, 1970, Serial No. 86,368, now Patent No. 747,318--.

Signed and sealed this 1st day of May 1973.

(SEAL)
Attest:

EDWARD M.FLETCHER,JR.
Attesting Officer

ROBERT GOTTSCHALK
Commissioner of Patents